United States Patent [19]

Pizzigoni et al.

[11] Patent Number: 4,686,064

[45] Date of Patent: Aug. 11, 1987

[54] COMPOSITION FOR THE DESULPHATIZING CLEANING OF CARBONATIC STONE SURFACES

[75] Inventors: Giuseppe Pizzigoni, Busto Arsizio; Paolo Parrini, Novara, both of Italy

[73] Assignee: Larac S.p.A., Varese, Italy

[21] Appl. No.: 822,104

[22] Filed: Jan. 24, 1986

[30] Foreign Application Priority Data

Jan. 25, 1985 [IT] Italy ................... 19239 A/85

[51] Int. Cl.$^4$ ............................... C11D 7/12
[52] U.S. Cl. ................... 252/153; 252/156; 252/157; 252/158; 252/160; 252/173; 252/541
[58] Field of Search ............... 252/153, 156, 157, 158, 252/160, 173, 541

[56] References Cited

U.S. PATENT DOCUMENTS 3,511,707  5/1970  La Flamme ................... 252/156

FOREIGN PATENT DOCUMENTS 127721  12/1984  European Pat. Off. .

*Primary Examiner*—Robert A. Wax
*Attorney, Agent, or Firm*—Stevens, Davis, Miller & Mosher

[57] ABSTRACT

Compositions for the desulphatizing cleaning of stone surfaces of prevailingly carbonatic nature or of layers of such nature on different materials, consisting of a mixture of an anion exchange material (for instance an anionic exchange resin) with an aqueous solution of ammonium carbonate and optionally with additives.

6 Claims, No Drawings

COMPOSITION FOR THE DESULPHATIZING CLEANING OF CARBONATIC STONE SURFACES

BACKGROUND OF THE INVENTION

It is known how the continuous and diffuse use of fuels containing sulphurated substances, in the industrial, transport and home activities, has caused in the last decennia a considerable increase in the content of polluting substances in the atmosphere, among which is sulphur dioxide ($SO_2$).

Such situation has resulted in a quick deterioration of a great many manufactured objects exposed to the atmosphere, through mechanisms of chemical attack already individualized, such as, for instance, sulphatization due to $SO_2$.

Among the manufactured objects which have suffered and constantly suffer the attack of the atmospheric polluting agents, we can number the stone materials having prevailingly a carbonatic composition such as, for instance, marbles, sandstones, organogenic and sedimentary limestones.

The attacks usually show as considerable corrosions in the points subjected to rain washing away or in the form of patinas having a very variable color (black as well), which modify remarkably, in the non-washed away zones, the superficial look, the chromatic appearance, and the reflecting power of the stone materials.

The patina of the carbonatic material consists substantially of dihydrate calcium sulphate ($CaSO_4.2H_2O$) coming from sulphur dioxide. As said dihydrate calcium sulphate is considerably more soluble than the other components of the stone materials, it is removed from the surfaces owing to rain washing away, leaving signs of evident corrosions.

Furthermore, dihydrate calcium sulphate shows a specific volume that is higher than that of carbonate, therefore the formation of dihydrate calcium sulphate becomes dangerous especially on sculptured parts and on materials having a heterogeneous surface and mass.

Moreover, there is the consideration that mortars having a prevailing or a whole content of lime which had been used diffusely until recently, both in plasters and in the binding of bricks and/or stones in masonry works, undergo the same phenomena of atmospheric decay as the carbonatic stone materials.

Consequently, we may note how masonry structures made of tiles and cement can be disfigured considerably because of patinas and scales of sulphatized material due to evaporation of flows of desultory rain washings away or of condensation of fogs and dews.

The same danger is represented by building elements consisting of carbonatic materials inserted in masonry structures made both of cement and of tiles.

Another considerable effect of sulphatization is the well-known effect due to the alteration of the pictorial layer of the frescos which, when coupled with the moisture action, can give rise to the complete ruin of the work.

The restoration of the damaged stone surfaces, both from an aesthetic and from a functional point of view, foresees the removal of the sulphatization patinas, and in the case of works having a remarkable artistic interest, it presents very delicate aspects.

A few of the most utilized techniques of restoration foresee abrasion actions, rinsings with water in large quantities coupled with brushings; furthermore, use is made of preparations the action of which is more or less known and controllable. Ammonium carbonate is, among the known reactants, one of the cheapest and most effective reactants for attacking calcium sulphate. Said ammonium carbonate is capable of reacting with calcium sulphate forming again calcium carbonate and ammonium sulphate through a double exchange reaction. Unfortunately, that does not lead to the restoration of the pristine surface of the stone material, as dihydrate calcium sulphate has a specific volume higher than that of carbonate and, therefore, the exchange reaction is generally coupled with a disgregation of the sulphatized layer.

In addition, the formed ammonium sulphate turns out to be disposable for a new sulphatization of other carbonatic zones of the stone materials and, therefore, at the end, the starting problem occurs again.

In the desulphatizing treatments of the frescos by means of ammonium carbonate, a second treatment, in spite of a few application problems, by means of barium hydroxide, was used successfully to stop the development of ammonium sulphate.

THE PRESENT INVENTION

We have now found that the desulphatization of stone surfaces having prevailingly a carbonatic composition or of layers of the same nature deposited on other materials, may be achieved easily by means of an aqueous solution of ammonium carbonate without the drawbacks coming from the formation of ammonium sulphate, if a material of anion exchange, preferably in the form of powder, is added to the solution of ammonium carbonate.

The functional groups of said anion exchange material may be salified, or, preferably, in the activated state, for instance in the form of amino groups or of non-salified quaternary ammonium bases.

Examples of suitable materials of anion exchange are the synthetic resins of anion exchange, endowed with basic functional groups, in particular the resins having a matrix based on styrene polymers or copolymers, on acrylic monomers or on polycondensation resins.

Thus an object of the present invention concerns the compositions suitable to be used as desulphatization agents of stone surfaces, having prevailingly a carbonatic composition, or of layers of the same nature deposited on different materials, which compositions comprise mixtures of an aqueous solution of ammonium carbonate with an anion exchange material.

A further object of the present invention consists in using such compositions in the cleaning/desulphatizing process of stone surfaces or of layers as defined hereinbefore. The ratio by weight between the material of anion exchange and solution of ammonium carbonate is not critical for the achievement of the purposes of the invention. The limits of such ratio are generally suggested by the necessity of obtaining the compositions of the invention in the form of a paste sufficiently thick and adhesive for the surfaces to be treated. The ratio by weight exchange material/solution of ammonium carbonate generally ranges between about 0.6 and about 1.3 and is preferably about 0.8.

Suitable concentrations of the solutions of ammonium carbonate range between 5 and 25% by weight, but that does not constitute a restriction. Such concentrations may be varied by simple stoichiometric valuations depending on the sulphatization degree of the surfaces to be treated. The most useful concentrations are those of about 10%, as they may be obtained in the quickest way.

A granulometry of small size of the material of anion exchange is useful for the preparation of moist mixtures of good buttering, capable of adhering to and entering all the surface unevenesses of the stone materials, as well as to provide a mass having a strong and immediate fixing power of the sulphuric ions releated by ammonium carbonate. Preferably, the particles of the exchange material have a size below 0.1 mm.

The desulphatizing action of the mixture continues as long as it remains sufficiently moist and its application does not present any problem for horizontal surfaces. On the contrary, a few problems can arise if the atmospheric conditions promote an excessive evaporation and if the mixture is applied on vertical surface, where such a mixture, owing to its own weight and to the progressive drying it is subjected to, can lose adhesion and, therefore, can no longer carry on its own action.

The above-mentioned drawbacks can be obviated or at least reduced remarkably, by additioning of suitable additives to the mixture. The rate of evaporation and, consequently, of drying, in case of need, can be adjusted by addition of small amounts of polyalcohols.

Glycerin, ethylene glycol and the condensed forms thereof are efficacious polyalcohols.

The mechanical effect of the weight can be limited by lowering the volumetric density of the mixture by foaming. The anionic surfactants, such as, for instance, alkylphenols and ethoxylated alkyls, which do not interact with the exchange resins or with calcium released during the desulphatizing process, are efficacious foaming agents. The cationic surfactants, such as quaternary ammonium salts and ethoxylated amino derivatives are useful as well. Foams may be stabilized by means of appropriate substances such as, for instance, the non-ionic hydrosoluble macromolecular ones added in a suitable amount.

After application, the compositions according to the invention can be removed easily after at least partial drying (in the case they had not come off spontaneously), together with the whole sulphatized layer. The stone surface regains then a look very similar to its original look, after a slight and simple rinsing with water. The rinsing does not necessarily have to be excessive, as the solutions of ammonium carbonate do not leave any persistent residue.

The following examples will illustrate the present invention in more detail but are not intended to be limiting.

EXAMPLE 1

A typical formulate, having the following composition, in parts by weight:
53.5 of a 7% aqueous solution of ammonium carbonate;
1.2 of ethoxylated nonylphenol with an average content of 9 units of ethylene oxide;
1.2 of ethoxylated nonylphenol, on the average with 30 units of ethylene oxide;
0.1 of polyethylene oxide having a molar weight of 600,000;
1.0 of glycerin; and
43.0 of an anionic resin (Kastel A 500, produced by Montefluos S.p.A., in the non-salified form) in the form of powder, having a size below 0.10 mm
was prepared in the form of foam by adding the resin in powder, little by little, to the solution of ammonium carbonate containing all the other compounds and kept under strong stirring.

By means of only one application of the foam thus obtained, in the amount of about 1 Kg/sq.m., it was possible to remove completely on a summer day an average sulphatization of 17 g/sq.m. of $SO''_4$ present on a vertical surface of plastered travertine that was deeply yellowed after an exposure of about 20 years to the action of the atmosphere of an industrial area.

After removal of the dry foam and a simple rinsing with a wet sponge, the treated surface regained its original look. By analyzing the dried foam it was possible to ascertain that the exchange of the sulphuric ion of the sulphatized layer had occurred, whereas, it was absent in the smoothest zones of the surface.

A few zones that, at the beginning, appeared as blackened with evident pits were reclaimed and cleaned up by means of a second foam application.

The dry foam, recovered at the foot of the treated surface or detached from same, was dispersed again in a solution of ammonium carbonate and used again with the same method for a few times before its effectiveness was reduced.

EXAMPLE 2

A formulate, consisting of, in parts by weight:
55.5 of an aqueous solution at 15% of ammonium carbonate;
1.2 of ethoxylated nonylphenol, with, on the average, 9 units of ethylene oxide;
1.2 of ethoxylated nonylphenol with, on the average, 30 units of ethylene oxide;
0.1 of polyethylene oxide having a molar weight of 600,000; 42.0 g of an anionic resin in the form of powder, having a polystyrene matrix, containing nonsalified functional groups —$NH_2$, and having a particle diameter below 0.1 mm,
was applied, in the form of a foamy mixture, in the amount of 1–1.5 Kg/sq.m., on a moist day and at a temperature of 8° C., on a vertical surface of yellowed and sulphatized travertine containing about 20 g/sq.m. of $SO''_4$ ions. After about 8 hours, the mixture was removed and the surface rinsed by simple sponging with water.

After drying, the travertine had regained its own original look, without showing any sulphatization.

EXAMPLE 3

A formulate consisting of, in parts by weight:
54.0 of an aqueous solution at 15% of ammonium carbonate;
1.5 of ethoxylated nonylphenol with, on the average, 30 units of ethylene oxide;
1.0 of alkylbenzyl ammonium chloride;
1.0 of diethylene glycol;
44.5 of an anionic resin in the form of powder, in the non-salified form (Kastel A 101 produced by Montefluos S.p.A.) having a particle size below 0.1 mm,
was prepared as in the preceding example, until a foam was obtained.

The mixture was tested by applying about 1.5 Kg/sq.m. thereof on a surface of a white Verona marble, remarkably blackened and sulphatized (25-30 g/sq.m. of $SO''_4$), removing by means of only one application both the sulphatized layer and the blackened part.

The stone regained its own original color after a simple sponging with a little water.

In this case as well, the analysis of the foam confirmed that the exchange of sulphuric ion had taken place.

EXAMPLE 4

A formulate consisting of, in parts by weight:
53.0 of an aqueous solution at 10% of ammonium carbonate;
1.5 of ethoxylated nonylphenol with, on average, 9 units of ethylene oxide;
2.0 of ethoxylated nonylphenol with, on average, 30 units of ethylene oxide;
1.0 of triethylene glycol;
0.5 of polyethylene oxide having a molar weight of about 600,000; and
42.0 of the non-salified strong anionic resin, (Kastel A 500), in the form of powder having a particle size below 0.1 mm,
after having been applied only once in the form of foam on a black scale of sulphatized material coating a pilaster made of reinforced concrete and originated by a desultory washing away from over-hanging travertine cornices, resulted after drying and sponging with water in the nearly complete elinination of the scale.

EXAMPLE 5

A formulate consisting of, in parts by weight:
54.0 parts of a 15% aqueous solution of a ammonium carbonate;
1.5 parts of octyl ethylene oxide with, on the average, 8 units of ethylene oxide;
1.0 part of alkylbenzyl ammonium chloride;
1.0 part of glycerin; and
42.5 parts of non-salified anionic resin, in the form of powder, type $NH_2$ having a size below 0.1 mm,
obtained in the form of foam, was applied on sand-stone surfaces and on limestone surfaces having different origins and being remarkably sulphatized (from 15 to 45 g/sq.m. of $SO''_4$). After drying and removal of the foam, the surface regained a look very similar to its original look by sponging with water.

EXAMPLE 6

A formulate consisting of, in parts by weight:
53.0 parts of a solution at 20% of ammonium carbonate;
1.5 parts of ethoxylated nonylphenol with, on the average, 9 units of ethylene oxide;
1.0 part of ethoxylated nonylphenol with, on the average, 40 units of ethylene oxide;
1.0 part of diethylene glycol;
0.3 part of polyethylene oxide having a molar weight of about 600,000; and
43.2 parts of a strong anionic resin, in the form of powder, in the non-salified form,
obtained in the form of foam was applied only once (about 1 Kg/sq.m.) on a surface of red Verona marble having a sulphatization of 50-60 g/sq.m. $SO''_4$, which resulted in the almost complete desulphatization after removal of the dry foam and simple sponging of the surface with water.

EXAMPLE 7

A mixture was prepared by mixing 56 parts by weight of an aqueous solution at 10% of ammonium carbonate with 44 parts by weight of a non-salified anionic resin (Kastel A 500) in powder form with particles having a diameter below 0.1 mm.

Such mixture was applied on a yellowed and blackened travertine surface (containing 15-22 grams of $SO''_4$ ion per sq.m.), showing a nearly horizontal orientation.

After 4 hours, the mixture appeared dry and was removed by means of a very light mechanical action. The lower surface was rinsed by sponging with a little water. The look of the stone appeared as restored in the yellowed zones; the blackened zones needed a second application of the composition. The chemical analysis confirmed the fixation of $SO''_4$ ion in the resin.

We claim:

1. A composition for the desulphatizing cleaning of stone surfaces having a prevailingly carbonatic composition or of layers of such nature on different materials, which composition comprises a mixture of a material of anion exchange with an aqueous solution of ammonium carbonate.

2. A composition according to claim 1, wherein the ratio by weight between the material of anionic exchange and the aqueous solution of ammonium carbonate is about 0.8.

3. A composition according to claim 1, wherein the material of anion exchange is an anionic synthetic resin.

4. A composition according to claim 1, further containing a polyalcohol.

5. A composition according to claim 1, further containing a surfactant.

6. The method of desulphatizing cleaning stone surfaces having prevailingly a carbonatic composition, or of layers of such composition on different materials, which comprises applying to said surfaces a composition according to claim 1.

* * * * *